(12) United States Patent
Dukes et al.

(10) Patent No.: US 11,924,036 B1
(45) Date of Patent: Mar. 5, 2024

(54) AUTOMATIC SAAS OPTIMIZATION

(71) Applicant: Cisco Technology, Inc., San Jose, CA (US)

(72) Inventors: Darren Russell Dukes, Ottawa (CA); Jeevan Sharma, Pleasanton, CA (US); Fabio R. Maino, Palo Alto, CA (US); Alberto Rodriguez-Natal, Leon (ES)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/132,830

(22) Filed: Apr. 10, 2023

(51) Int. Cl.
*H04L 41/0823* (2022.01)
*H04L 67/10* (2022.01)

(52) U.S. Cl.
CPC .......... *H04L 41/0823* (2013.01); *H04L 67/10* (2013.01)

(58) Field of Classification Search
None
See application file for complete search history.

(56) References Cited

U.S. PATENT DOCUMENTS 11,483,290 B2 * 10/2022 Radhakrishnan ... H04L 63/0263
11,546,301 B2 * 1/2023 Mutnuru ............. H04L 63/0263
2016/0164924 A1 6/2016 Rosenberg
2020/0389417 A1 12/2020 Wetterwald
2021/0117306 A1 4/2021 Somashekar
2023/0164029 A1 * 5/2023 Mermoud ............. H04L 41/145
 709/220
2023/0259415 A1 * 8/2023 Kairali ................. G06F 9/547
 719/328
2023/0300059 A1 * 9/2023 Rodriguez Natal .... H04L 67/50
 709/238

FOREIGN PATENT DOCUMENTS

CN 102135883 7/2011
KR 20130047070 5/2013

* cited by examiner

*Primary Examiner* — Quang N Nguyen
(74) *Attorney, Agent, or Firm* — Lee & Hayes P.C.

(57) ABSTRACT

Techniques for enabling a network access provider to make automatic Software as a Service (SaaS) optimization decisions. Among other things, the techniques may include determining a SaaS application that is being accessed by client endpoints via flows through a network access provider. The techniques may also include determining, based at least in part on a policy associated with the network access provider, whether to enable network optimizations for traffic through the network access provider to the SaaS application. Based at least in part on a determination that the network optimizations are to be enabled for the traffic to the SaaS application, the techniques may include installing a service definition associated with the SaaS application in a service policy database of the network access provider.

20 Claims, 6 Drawing Sheets

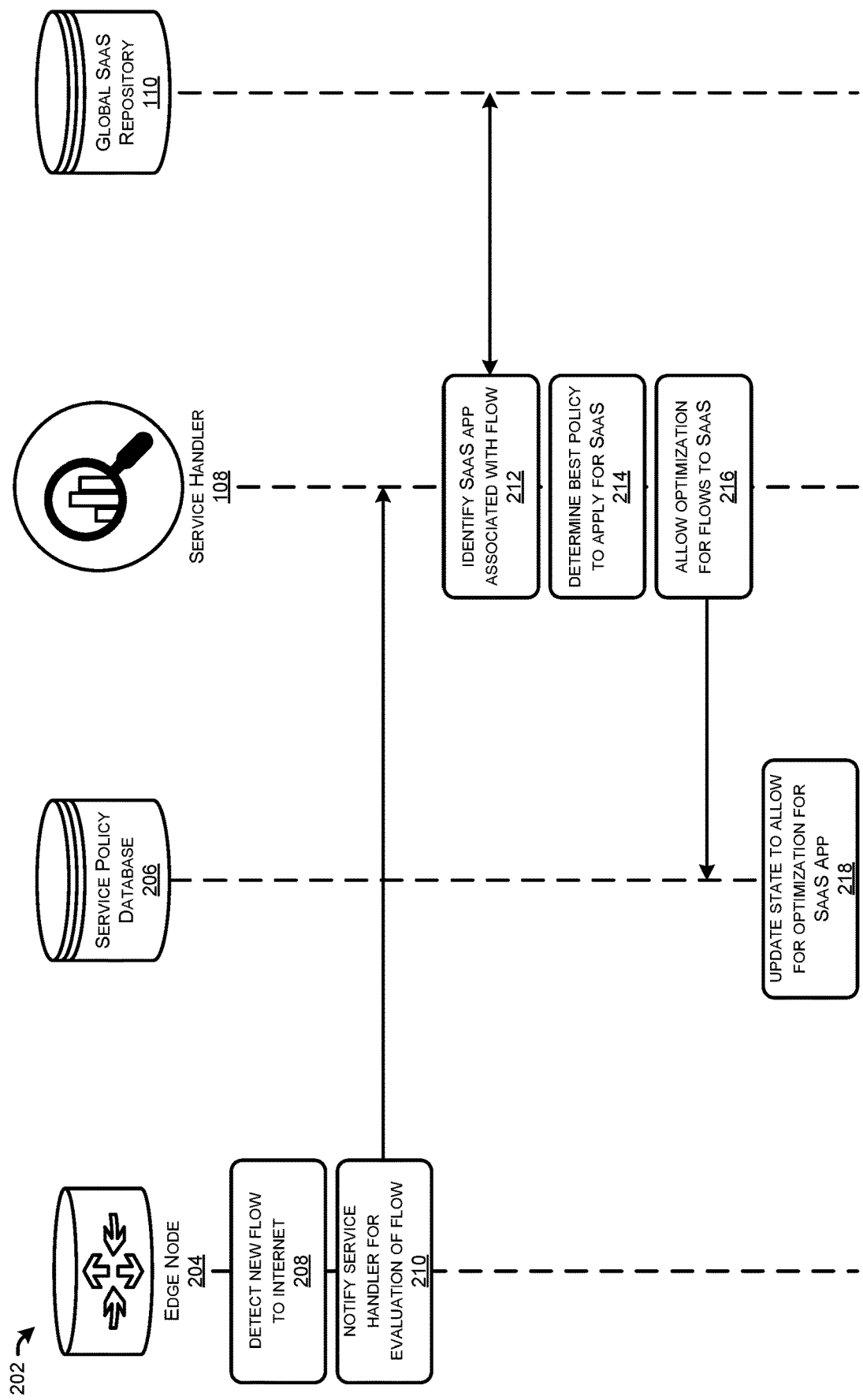

AUTOMATIC SAAS OPTIMIZATION

TECHNICAL FIELD

The present disclosure relates generally to techniques for, among other things, enabling a network access provider to make automatic Software as a Service (SaaS) optimization decisions.

BACKGROUND

When consuming a Software as a Service (SaaS) application, it is common to have multiple frontend endpoints for the same SaaS application. Access devices can be provisioned with different SaaS application endpoint definitions and path selections per SaaS application, and many solutions today support via manually provisioned service endpoints, either from a pre-defined list or custom service definition. However, as SaaS applications are deployed/consumed, manual processes must be invoked to enable or install service definitions into a network access provider's service list, which is slow and does not keep up with the speed of deployment. Today, for SaaS optimization, service definitions need to be enabled for SaaS applications from a predefined list or defined manually by application developers. However, a network access provider has no way to automatically determine on its own which SaaS applications should be enabled/defined for optimization and then proceed to do so.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 2A and 2B collectively illustrate an example architecture and workflow performed by different entities of the example architecture to make an automatic SaaS optimization decision.

DESCRIPTION OF EXAMPLE EMBODIMENTS

Overview

Figure 1:
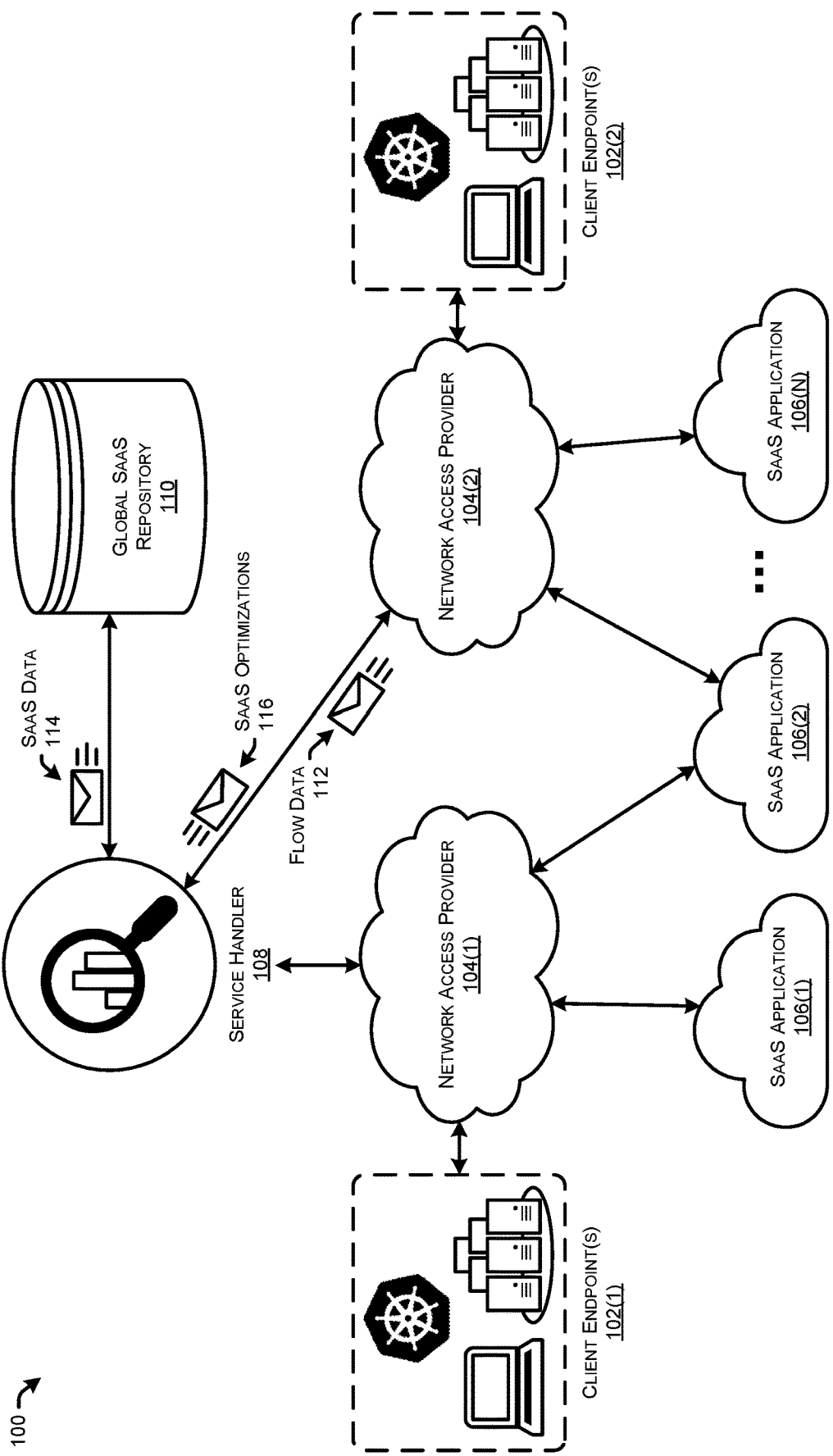
FIG. 1 illustrates an example architecture that may implement various aspects of the technologies described herein for enabling network access providers to make automatic Software as a Service (SaaS) optimization decisions.

This disclosure describes various technologies for, among other things, enabling a network access provider to make automatic Software as a Service (SaaS) optimization decisions. By way of example, and not limitation, the techniques described herein may include determining a SaaS application that is being accessed by client endpoints via flows through a network access provider. The techniques may also include determining, based at least in part on a policy associated with the network access provider, whether to enable network optimizations for the flows through the network access provider to the SaaS application. Based at least in part on a determination that the network optimizations are to be enabled for the flows to the SaaS application, the techniques may include installing a service definition associated with the SaaS application in a service policy database of the network access provider.

Additionally, the techniques described herein may be performed as a method and/or by a system having non-transitory computer-readable media storing computer-executable instructions that, when executed by one or more processors, performs the techniques described above and herein.

Example Embodiments

As noted above, network access providers have no way to automatically determine on their own which Software as a Service (SaaS) applications should be enabled/defined for optimization and then proceed to do so. Instead, services must be instantiated by SaaS providers, and any logging takes place in a network access provider's service registry. In other words, network access providers are the ones doing, and with access to, the logging and not SaaS providers, as SaaS providers have no control on the network access provider's infrastructure. This application is directed to automated techniques for determining which specific SaaS applications to enable for probing/optimization and when to enable them.

According to the technologies disclosed herein, in some examples, a global SaaS repository may store the services (applications) of multiple SaaS providers. In some instances, SaaS applications may be defined in the global SaaS repository by URL, domain name, internet protocol (IP) address, port, protocol, among other network attributes. In some examples, SaaS applications may be learned from SaaS providers or by other trusted means (e.g., learned from clients of the service). For instance, a network access provider may give clients access to a network and endpoints via multiple interfaces/paths, and/or multiple edge nodes, and the clients may consume SaaS applications at those endpoints via the network access provider. As such, the network access provider may collect a large amount of information per client and/or its access point including flow information (e.g., using solutions such as NetFlow, IPFIX, sFlow, etc.), DNS queries (e.g., using solutions such as umbrella, etc.), application performance (e.g., using solutions such as thousand eyes, etc.). In some examples, the network access provider may export flow information, domain names, or application endpoint usage for its clients. In some examples, the network access provider may further provide APIs (application programming interfaces) for use to install detected SaaS applications in its service policy database to allow the network access provider to steer traffic to those SaaS applications via preferred paths or interfaces, as well as to enable monitoring and/or probing of the SaaS to find these preferred paths or interfaces.

In some examples, the technologies disclosed herein also provide for a service handler that consumes the network access provider data and the global SaaS repository to detect SaaS applications used by clients of the network access provider. In some examples, the service handler may install, on-demand, service definitions in the network access provider's service policy database. Additionally, in some examples, the service handler may implement policy to determine when/how to install the service definitions for SaaS applications that it detects are in use. The policy may include, in some instances, service level agreement (SLA) parameters based on learned characteristics of the SaaS applications, the volume of traffic that is going towards a given SaaS application, etc. In examples, the service handler may also be configured to look for specific types of SaaS applications, to look for SaaS applications that are being consumed by particular users, to only look for SaaS applications in certain network access provider edges, and/or the like.

In different examples and implementations, the service handler may be part of the network access provider, the global SaaS repository, or neither. Similarly, the global SaaS repository may be part of the network access provider, the SaaS provider, or neither. In some examples, the network access provider may be a wide area network (WAN), a specific type of WAN (e.g., a software-defined wide area network (SD-WAN)), or any other type of communication network that facilitates data flows between network endpoints, including any collection or combination of the example networks described herein.

For example, an SD-WAN solution may utilize the technologies disclosed herein, including the global SaaS repository and service handler, to automatically detect the specific SaaS applications that are being consumed by client endpoints (e.g., users, applications, etc.) in the network and automatically enable and/or define the SaaS applications for SaaS optimization. For instance, the service handler may extract information about the flows currently present in the SD-WAN, correlate that information with the SaaS signatures in the global SaaS repository, and determine, on-demand, which SaaS applications specific service definitions need to be enabled/installed in the SD-WAN.

As another example workflow associated with the techniques described herein, a network access provider may offer network connectivity to a client. For instance, the client may be exchanging traffic with a datacenter and a first SaaS application. The service handler may be configured to look for automatic service enablement in the network access provider edge. Then, without prior knowledge to the system, the client starts a flow with a second SaaS application (SaaS B). In response, the network access provider edge detects that a new flow is being established to the internet, potentially to a SaaS. The network access provider edge may notify the service handler for evaluation of this new flow. In turn, the service handler may use a database of the global SaaS repository to identify the SaaS application (SaaS B) and compute the best policies to apply. Once determined, the service handler may then notify the network access provider that a new SaaS application (SaaS B) is being consumed and indicate the best policies to apply for the new SaaS application. The network access provider may then, in some examples, update its internal state to optimize connectivity for this new SaaS application (in addition or alternative to other SaaS applications already identified) based on the input from the service handler. Although the example above describes a flow, the techniques of this disclosure may be applied to even more coarse-grained communications. For instance, the techniques can be applied when traffic is being sent to a new destination subnet or to a new fully qualified domain name (FQDN) domain, to allow for more coarse-grain with the parsing of the traffic.

In some examples, the techniques of this disclosure may be particularly advantageous for scenarios in which there is little to no communication with application developers regarding networking optimizations required by their applications because the techniques of this disclosure may be utilized by network access providers to, nonetheless, enable optimizations for those applications. In other words, the techniques of this disclosure enable network access providers to optimize communications for SaaS applications that would not previously have been possible without human intervention. These and other advantages will be readily apparent to those having ordinary skill in the art.

By way of example, and not limitation, a method according to the technologies disclosed herein may include determining a SaaS application that is being accessed by client endpoints via flows through a network access provider (e.g., WAN, SD-WAN, etc.). For instance, a service handler as described herein may determine or otherwise identify the SaaS application. In some examples, the service handler may be accessible or otherwise available to one or multiple different network access providers to determine, on behalf of those network access providers, the SaaS applications that the network access providers are providing their client endpoints with connectivity to.

In some examples, the service handler may determine the SaaS application based at least in part on flow data received from the network access provider. The flow data may be associated with the flows through the network access provider. For instance, the flow data may include or otherwise indicate information associated with the client endpoint(s) and/or an access point used by the client endpoint, such as flows, destination addresses, DNS queries, SaaS application usage, or the like.

In some examples, the service handler may utilize the global SaaS repository to determine/identify the SaaS application. For instance, the service handler may access the global SaaS repository to identify the SaaS application being accessed. In some examples, the service handler may use the flow data or other data received from the network access provider to look up the SaaS application in the repository. As an example, SaaS applications may be defined in the global SaaS repository by URL, domain name, internet protocol (IP) address, port, protocol, among other network attributes, and the service provider may use some or all of the flow data received from the network access provider that is associated with a flow to the SaaS application to look up the identity of the SaaS application. In some examples, the global SaaS repository may store service definitions associated with the SaaS applications, and the service handler may obtain these service definitions in response to determining that flows to a specific SaaS application are to be optimized.

In some examples, the techniques may also include determining whether to enable network optimizations (e.g., SaaS optimizations) for the flows through the network access provider to the SaaS application. For instance, based at least in part on identifying the SaaS application that is being accessed, the service handler may determine whether to enable the network optimization(s) for the flows through the network access provider to the SaaS application.

In some examples, the service handler may determine whether to enable the network optimization(s) based at least in part on a policy associated with the network access provider and/or the SaaS application. In some examples, the policy associated with the network access provider may indicate a threshold number of flows and/or volume of traffic to a given SaaS application before network optimizations can be enabled, and determining whether to enable the network optimizations for the flows may include determining, by the service handler, whether a number of the flows through the network access provider to the SaaS application is greater than the threshold.

In some examples, the service handler may facilitate installing a service definition associated with the SaaS application in a service policy database of the network access provider to enable network optimizations for the flows through the network to the SaaS application. In some instances, the service handler may facilitate installing the service definition based at least in part on making a determination that the network optimizations are to be enabled for the flows to the SaaS application. In some examples, the service definition may be obtained by the service handler from the global SaaS repository. In some examples, the service handler may utilize an application programming interface (API) exposed by the network access provider to install the service definition in the service policy database such that the network access provider steers traffic to the SaaS application via preferred paths or interfaces.

As noted above, in some examples the service handler may be associated with multiple different network access providers, in addition to, or alternatively to, a single network access provider. As such, the service handler may determine whether to enable network optimizations for other flows through other network access provider(s) to the SaaS application (e.g., based on other policies for those network access providers). Additionally, in some examples, based at least in part on a determination that the network optimizations are to be enabled for the other flows to the SaaS application, the service handler may facilitate installing the service definition associated with the SaaS application in other service policy databases associated with the other network access provider(s) so that the SaaS optimizations can be enabled for the SaaS application.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein for enabling network access providers to make automatic Software as a Service (SaaS) optimization decisions. The architecture 100 includes client endpoint(s) 102(1) and 102(2) (hereinafter referred to collectively as "client endpoint(s) 102"), network access providers 104(1) and 104(2) (hereinafter referred to collectively as "network access providers 104"), one or more SaaS applications 106(1), 106(2), and 106(N) (hereinafter referred to collectively as "SaaS applications 106"), (where N represents any number), a service handler 108, and a global SaaS repository 110.

In examples, the client endpoint(s) 102 may include user devices (e.g., computers, laptops, cell phones, tablets, etc.), servers, applications, clusters, containers, or the like. For instance, one of the client endpoint(s) 102 may be a cluster associated with an application orchestration system (e.g., a Kubernetes cluster).

In examples, the network access providers 104 may provide connectivity so that their respective client endpoint(s) 102 may communicate with the different SaaS applications 106. In some examples, the network access providers 104 may be wide area networks, specific types of wide area networks (e.g., software-defined wide area networks), or any other type of communication network that is capable of facilitating data flows between the client endpoint(s) 102 and the SaaS applications 106.

In examples, the service handler 108 may consume flow data 112 provided by the network access providers 104 and SaaS data 114 from the global SaaS repository 110 to detect the SaaS applications 106 that are being accessed by the client endpoint(s) 102 via flows through the network access providers 104. In some examples, the service handler 108 may enable SaaS optimizations 116 for the network access providers 104. For instance, the service handler 108 may install, on-demand, service definitions in service policy databases of the network access providers 104. Additionally, in some examples, the service handler 108 may implement policy to determine when/how to install the service definitions of the SaaS applications 106 that it detects are in use. The policy may include, in some instances, service level agreement (SLA) parameters based on learned characteristics of the SaaS applications 106, the volume of traffic that is going towards a given SaaS application 106(1), etc. In examples, the service handler 108 may also be configured to look for specific types of SaaS applications 106, to look for SaaS applications 106 that are being consumed by particular users or particular client endpoint(s) 102, to only look for SaaS applications 106 in certain network access provider 104 edges, and/or the like. In some examples, the service handler 108 may just detect the SaaS service and then it would be the network access provider(s) that would create/install the policy.

In examples, the global SaaS repository 110 may store the services (applications) of multiple SaaS providers. In some instances, SaaS applications 106 (and/or their respective service definitions) may be defined in the global SaaS repository 110 by URL, domain name, internet protocol (IP) address, port, protocol, among other network attributes. In some examples, SaaS applications 106 may be learned from SaaS providers or by other trusted means (e.g., learned from clients of the service). For instance, a network access provider 104(2) may give its client endpoint(s) 102(2) access to a network and endpoints via multiple interfaces/paths, and the client endpoint(s) 102(2) may consume SaaS applications 106 at those endpoints via the network access provider 104(2). As such, the network access providers 104 may collect a large amount of information per client endpoint 102 and/or its access point including flow information (e.g., using solutions such as NetFlow, IPFIX, sFlow, etc.), DNS queries (e.g., using solutions such as umbrella, etc.), application performance (e.g., using solutions such as thousand eyes, etc.), and/or the like. In some examples, the network access provider 104(2) may export the flow data 112, as well as domain names, or application endpoint usage for its client endpoint(s) 102. In some examples, the network access providers 104 may further provide APIs (application programming interfaces) for use to install detected SaaS applications 106 in its service policy database to allow the network access providers 104 to steer traffic to those SaaS applications 106 via preferred paths or interfaces.

Although illustrated in FIG. 1 as a distributed system for ease of understanding, it is contemplated that the network access providers 104, the service handler 108, and the global SaaS repository 110 could be collocated and/or running on a same set of resources (e.g., located in a same data center). That is, in different examples and implementations, the service handler 108 may be part of each of the network access providers 104(1) and 104(2), the global SaaS repository 110, or neither. Similarly, the global SaaS repository 110 may be part of each of the network access providers 104(1) and 104(2), the SaaS providers associated with the SaaS applications 106, the service handler 108, or neither.

Figure 2A:
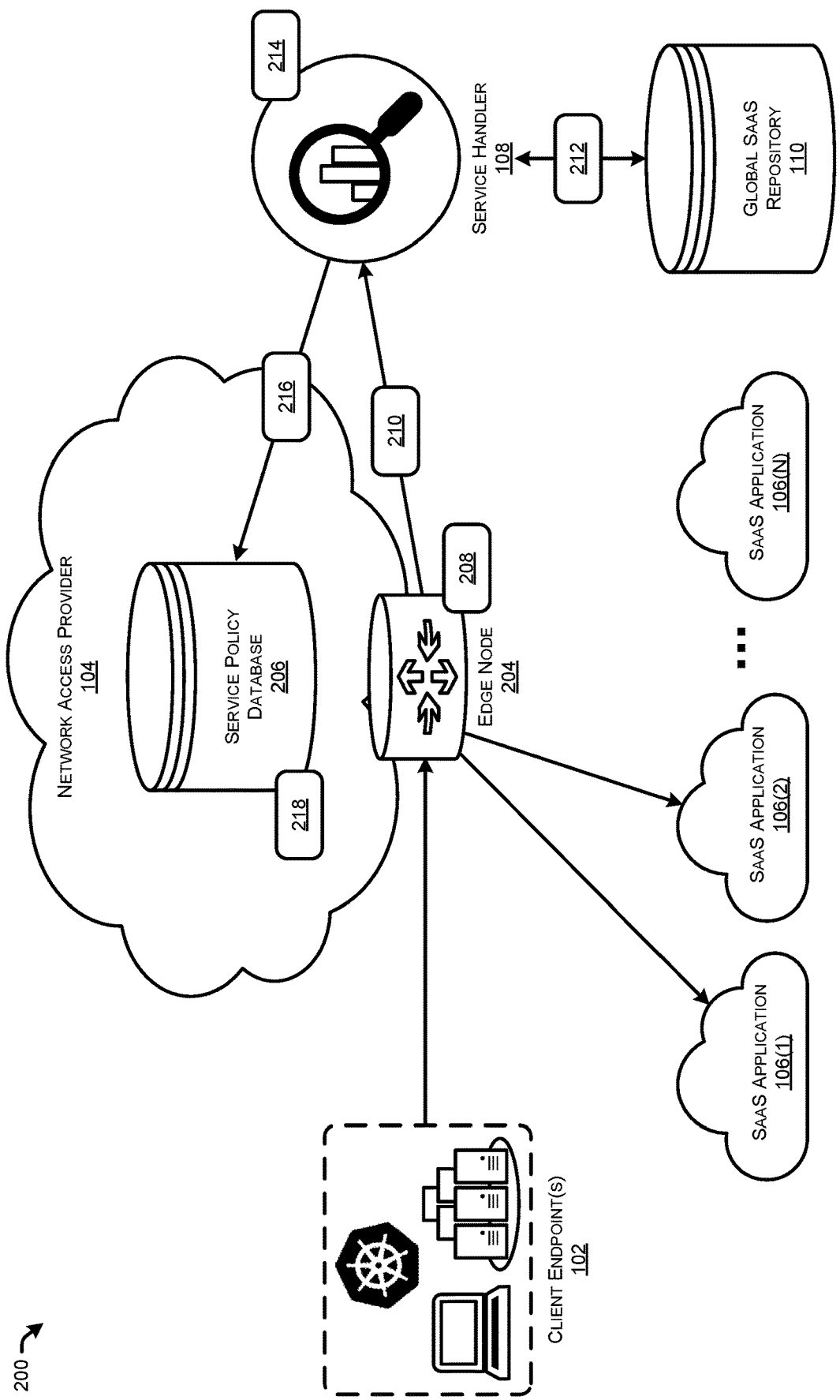

FIGS. 2A and 2B collectively illustrate an example architecture 200 and workflow 202 that may be performed by different entities of the example architecture 200 to make an automatic SaaS optimization decision. A shown in FIG. 2A, the different entities in the example architecture 200 include the client endpoint(s) 102, the network access provider 104, the SaaS applications 106, the service handler 108, and the global SaaS repository 110. Additionally, the network access provider 104 includes an edge node 204 and a service policy database 206.

In examples, the edge node 204 may be one of multiple edge nodes associated with the network access provider 104. In some examples, the edge node 204 is configured to establish and/or detect new flows between the client endpoint(s) 102 and the internet (e.g., flows to the SaaS applications 106), flows to datacenters (e.g., enterprise datacenters), on-premise resources, and the like. In some examples, the edge node 204 may be a logical node that comprises multiple devices performing different roles. For instance, the edge node 204 may be logically divided into a flow detection side and a flow enforcement side, with one or multiple devices on each side. In this way, the flow detection side of the edge node 204 may detect new flows through the network access provider 104 that are going to internet destinations (e.g., SaaS applications 106) and notify the service handler 108. If the service handler 108 determines that those new flows are to be optimized, then the enforcement side of the edge node 204 may enforce different networking policies for optimally routing those flows to the SaaS applications 106.

In examples, the service policy database 206 is configured to store service definitions associated with detected SaaS applications 106 for which flows are to be optimized for. In some examples, the service definitions may be installed or otherwise stored in the service policy database 206 by the service handler 108 using an API exposed by the service policy data base 206 and/or the network access provider 104. This may allow, in some examples, the service handler 108 to install these service definitions on-demand in the service policy database 206 of the network access provider 104 such that the edge node 204 and/or the network access provider 104 can steer traffic to the SaaS applications 106 via preferred paths or interfaces.

FIG. 2A also illustrates multiple operations 208-218 performed by the entities of the architecture 200, and these operations 208-218 are illustrated in more detail in the example workflow 202 illustrated in FIG. 2B. At operation 208, the edge node 204 detects a new flow to the internet that is traversing the network access provider 104. At this stage, the edge node 204 may not have any intelligence as to the service that it is connecting a client endpoint 102 to, other than the flow is going to the internet.

At operation 210, the edge node 204 notifies the service handler 108 for evaluation of the flow. In some instances, the edge node 204 notifies the service handler 108 based at least in part on the edge node 204 detecting the new flow to the internet. In other words, the edge node 204 may notify the service handler 108 for evaluation of the flow (or part of the flow (e.g., destination IP address)) in order to determine whether the flow is going to anew/unknown SaaS application 106, or if the flow is simply going to some other internet destination for which flow optimization is not to be prioritized by the network access provider 104. In some examples, not all new flows may be sent to the service handler 108. For instance, some new flows might already match the definition of installed SaaS applications in the policy database (e.g., which might be for optimized flows or not-to-be-optimized flows).

At operation 212, the service handler 108 may work with the global SaaS repository 110 to identify the SaaS application 106 associated with the flow. That is, the service handler 108 may utilize data (e.g., flow data, DNS queries, etc.) received from the edge node 204 and/or the network access provider 104 to determine whether the flow is in fact going to an endpoint associated with a SaaS application 106 and, if so, to correctly identify the specific SaaS application 106 that the flow is going to.

At operation 214, the service handler 108 determines the best policy to apply for the SaaS application. That is, the service handler 108 may determine whether to enable optimizations within the network access provider 104 for the flows that are going to the SaaS application 106. In some examples, this may involve the service handler 108 evaluating a policy associated with the network access provider 104 regarding SaaS optimization. For instance, the policy may indicate that optimizations may be made for the SaaS application 106 if a there is a certain number of flows going to the SaaS application 106, if certain client endpoint(s) 102 (e.g., certain applications, certain users, etc.) are accessing the SaaS application 106, if the volume of traffic to the SaaS application 106 exceeds a threshold, based on region originating/receiving the traffic, and/or the like.

At operation 216, the service handler 108 determines to allow optimization for the flows to the SaaS application 106 and performs an action with respect to the service policy database 206. In some examples, the action may include notifying the service policy database 206 (e.g., or the edge node 204) that optimizations are to be made for the SaaS application flows. Additionally, or alternatively, the action may include installing a service definition associated with the SaaS application 106 in the service policy database 206. In some examples, the service handler 108 and/or the service policy database 206 may obtain the service definition from the global SaaS repository 110.

At operation 218, the service policy database 206 may update its state to allow for optimization of flows directed to the SaaS application. In some examples, by installing the service definition in the service policy database 206, this may allow the network access provider 104 and any of its associated entities (e.g., controllers, edges, etc.) to realize that SaaS optimizations are to be made for the flows to the SaaS application 106. In other words, the service policy database 206 may store a series of service definitions associated with respective SaaS applications 106, and any service definition stored in the service policy database 206 implicitly or explicitly indicates that flow optimizations are to be made for flows directed to those respective SaaS applications 106.

Figure 3:
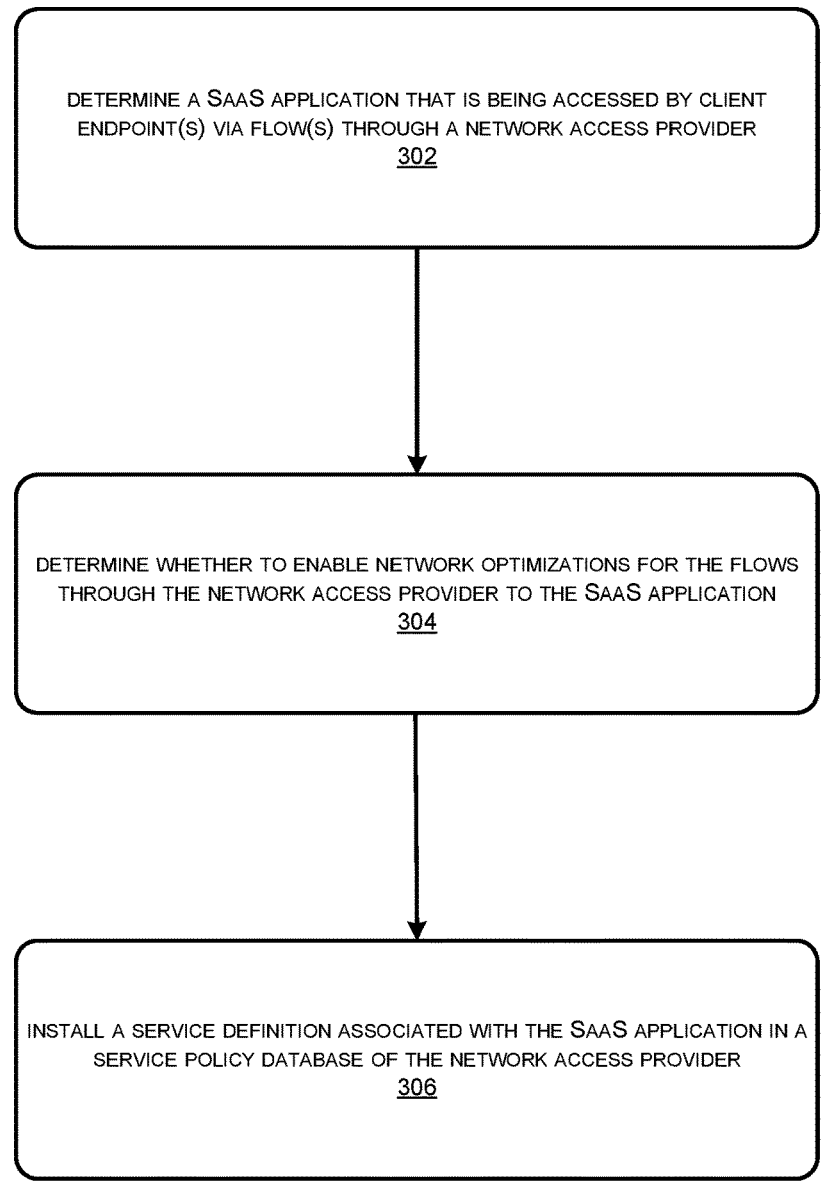
FIG. 3 is a flow diagram illustrating an example method associated with the techniques described herein.

FIG. 3 is a flow diagram illustrating an example method 300 associated with the techniques described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 300 begins at operation 302, which includes determining a SaaS application that is being accessed by one or more client endpoint(s) via one or more flow(s) through a network access provider. For instance, the service handler 108 may determine the SaaS application 106(1) that is being accessed by the one or more client endpoint(s) 102 via the one or more flow(s) through the network access provider 104. In some examples, the service handler 108 may determine/identify the SaaS application 106(1) based at least in part on flow data 112 received from the network access provider 104 and/or the edge node 204. The flow data 112 may be associated with the flows through the network access provider 104. For instance, the flow data 112 may include or otherwise indicate information associated with the client endpoint(s) 102 and/or an access point used by the client endpoint(s) 102, such as flows, DNS queries, SaaS application usage, or the like. In some examples, the service handler 108 may utilize the global SaaS repository 110 to determine/identify the SaaS application 106(1). For instance, the service handler 108 may access the global SaaS repository 110 to identify the SaaS application 106(1) being accessed. In some examples, the service handler 108 may use the flow data or other data received from the network access provider 104 to look up the SaaS application 106(1) in the repository. As an example, SaaS applications 106 may be defined in the global SaaS repository 110 by URL, domain name, internet protocol (IP) address, port, protocol, among other network attributes, and the service handler 108 may use some or all of the flow data received from the network access provider 104 that is associated with a flow to the SaaS application 106(1) to look up the identity of the SaaS application 106(1). In some examples, the global SaaS repository 110 may store service definitions associated with the SaaS applications 106, and the service handler 108 may obtain these service definitions in response to determining that flows to a specific SaaS application 106(1) are to be optimized.

At operation 304, the method 300 includes determining whether to enable network optimizations for the flows/traffic through the network access provider to the SaaS application. For instance, the service handler 108 may determine whether to enable network optimizations for the flows through the network access provider 104 to the SaaS application 106(1). In some examples, the service handler 108 may determine whether to enable the network optimization(s) based at least in part on a policy associated with the network access provider 104 and/or the SaaS application 106(1). In some examples, the policy associated with the network access provider 104 may indicate a threshold number of flows to a given SaaS application before network optimizations can be enabled, and determining whether to enable the network optimizations for the flows may include determining, by the service handler 108, whether a number of the flows through the network access provider 104 to the SaaS application 106(1) meets or exceeds the threshold.

At operation 306, the method 300 includes installing a service definition associated with the SaaS application in a service policy database of the network access provider. For instance, the service handler 108 may install the service definition associated with the SaaS application 106(1) in the service policy database 206 of the network access provider 104. In some examples, the service handler 108 may obtain the service definition from the global SaaS repository 110 and cause it to be installed in the service policy database 206 of the network access provider 104. Additionally, or alternatively, the service policy database 206 may obtain the service definition directly from the global SaaS repository 110 in response to receiving an indication (e.g., from the service handler 108) that the flows to the SaaS application 106(1) are to be optimized.

Figure 4:
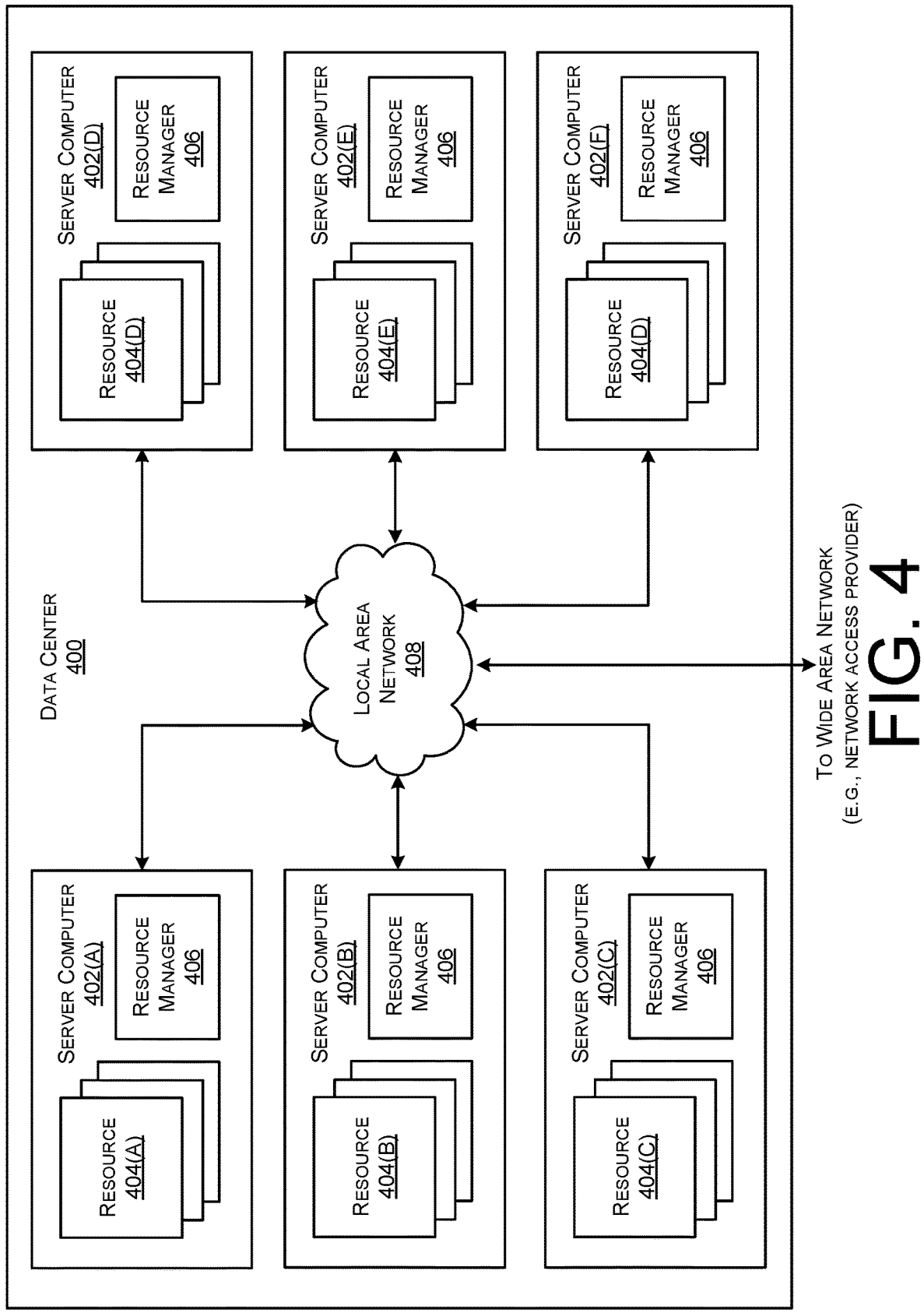
FIG. 4 is a computing system diagram illustrating an example configuration of a data center that can be utilized to implement aspects of the technologies disclosed herein.

FIG. 4 is a computing system diagram illustrating an example configuration of a data center 400 that can be utilized to implement aspects of the technologies disclosed herein. The example data center 400 shown in FIG. 4 includes several server computers 402A-402F (which might be referred to herein singularly as "a server computer 402" or in the plural as "the server computers 402") for providing computing resources. In some examples, the resources and/or server computers 402 may include, or correspond to, any type of networked devices or nodes described herein. Although described as servers, the server computers 402 may comprise any type of networked device, such as servers, switches, routers, hubs, bridges, gateways, modems, repeaters, access points, etc.

The server computers 402 can be standard tower, rack-mount, or blade server computers configured appropriately for providing computing resources. In some examples, the server computers 402 may provide computing resources 404 including data processing resources such as VM instances or hardware computing systems, database clusters, computing clusters, storage clusters, data storage resources, database resources, networking resources, security, packet inspection, and others. Some of the servers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single server computer 402. Server computers 402 in the data center 400 can also be configured to provide network services and other types of services. In various examples, describe herein, any one of the server computers 402, the resources 404, or the data center 400 itself may be a client endpoint 102.

In the example data center 400 shown in FIG. 4, an appropriate local area network (LAN) 408 is also utilized to interconnect the server computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402F in each data center 400, and, potentially, between computing resources in each of the server computers 402. It should be appreciated that the configuration of the data center 400 described with reference to FIG. 4 is merely illustrative and that other implementations can be utilized.

In some examples, the server computers 402 may each execute one or more application containers and/or virtual machines to perform techniques described herein. In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like. The computing resources 404 may be utilized to run instances of secure access nodes or other workloads.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations.

In examples, the data center 400 may be configured to host containerized applications/workloads. For instance, some of the server computers 402 and/or resources 404 of the data center 400 may be allocated to an application orchestration system for running containerized applications, such as Kubernetes, Docker Swarm, AWS Fargate, Azure Container Instances (ACI), and the like.

Figure 5:
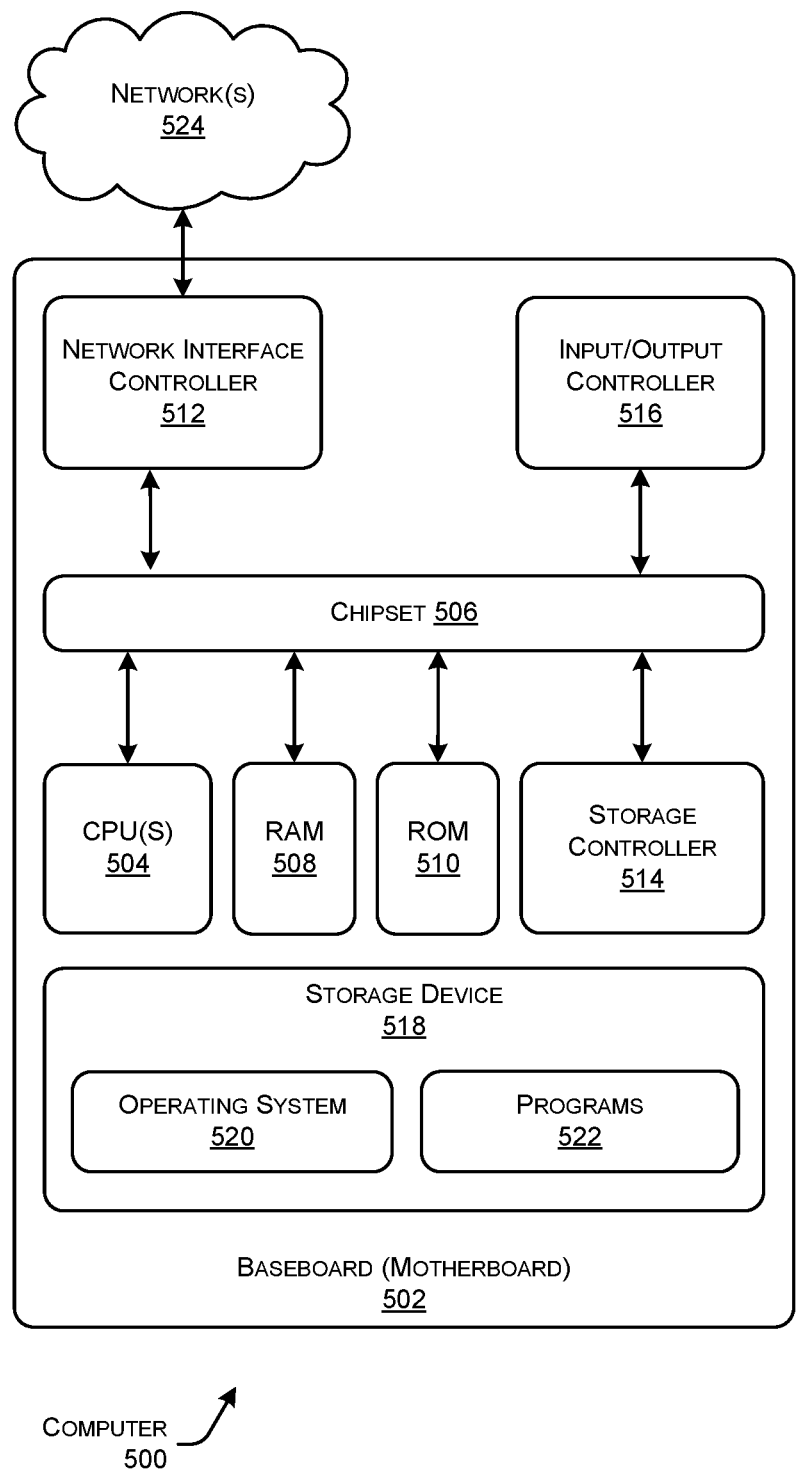
FIG. 5 is a computer architecture diagram showing an illustrative computer hardware architecture for implementing a computing device that can be utilized to implement aspects of the various technologies presented herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., edge node 204), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture 100 and or any components included therein, may be supported by one or more devices similar to computer 500. Stated otherwise, some or all of the operations performed by the architecture 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for enabling automatic Software as a Service (SaaS) optimization decisions for network access providers.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed at least partially by a service handler associated with a network access provider, the method comprising:
   determining a software as a service (SaaS) application that is being accessed by client endpoints via the network access provider;
   determining, based at least in part on a policy associated with the network access provider, whether to enable network optimizations for traffic through the network access provider to the SaaS application; and
   based at least in part on a determination that the network optimizations are to be enabled for the traffic to the SaaS application, installing a service definition associated with the SaaS application in a service policy database of the network access provider.

2. The method of claim 1, wherein determining the SaaS application that is being accessed comprises:
   receiving, from the network access provider, flow data associated with the traffic through the network access provider; and
   accessing a global SaaS repository to identify, based at least in part on the flow data, the SaaS application being accessed.

3. The method of claim 2, wherein the global SaaS repository is configured to store SaaS applications of multiple SaaS providers, the SaaS applications defined in the global SaaS repository by at least one of a domain name, an internet protocol (IP) address, a port, or a protocol.

4. The method of claim 2, wherein the flow data includes information associated with the client endpoints and access points of the client endpoints, the information including at least one of flows associated with the client endpoints or the access points, DNS queries of the client endpoints, or SaaS application usage of the client endpoints.

5. The method of claim 1, wherein installing the service definition associated with the SaaS application comprises utilizing, by the service handler, an application programming interface (API) exposed by the network access provider to install the service definition in the service policy database such that the network access provider steers traffic to the SaaS application via preferred paths or interfaces.

6. The method of claim 1, wherein the policy indicates a threshold volume of traffic to a given SaaS application to enable the network optimizations, and wherein determining whether to enable the network optimizations for the traffic comprises determining whether a volume of the traffic through the network access provider to the SaaS application is greater than the threshold volume.

7. The method of claim 1, wherein the service handler is associated with multiple different network access providers, the method further comprising:
   determining, based at least in part on another policy associated with another network access provider, whether to enable network optimizations for other traffic through the other network access provider to the SaaS application; and
   based at least in part on a determination that the network optimizations are to be enabled for the other traffic to the SaaS application, installing the service definition associated with the SaaS application in another service policy database of the other network access provider.

8. A system associated with a service handler, the system comprising:
   one or more processors; and
   one or more non-transitory computer-readable media storing instructions that, when executed, cause the one or more processors to perform operations comprising:
      determining a software as a service (SaaS) application that is being accessed by client endpoints via a network access provider;
      determining, based at least in part on a policy associated with the network access provider, whether to enable network optimizations for traffic through the network access provider to the SaaS application; and
      based at least in part on a determination that the network optimizations are to be enabled for the traffic to the SaaS application, installing a service definition associated with the SaaS application in a service policy database of the network access provider.

9. The system of claim 8, wherein determining the SaaS application that is being accessed comprises:
   receiving, from the network access provider, flow data associated with the traffic through the network access provider; and
   accessing a global SaaS repository to identify, based at least in part on the flow data, the SaaS application being accessed.

10. The system of claim 9, wherein the global SaaS repository is configured to store SaaS applications of multiple SaaS providers, the SaaS applications defined in the global SaaS repository by at least one of a domain name, an internet protocol (IP) address, a port, or a protocol.

11. The system of claim 9, wherein the flow data includes information associated with the client endpoints and access points of the client endpoints, the information including at least one of flows associated with the client endpoints or the access points, DNS queries of the client endpoints, or SaaS application usage of the client endpoints.

12. The system of claim 8, wherein installing the service definition associated with the SaaS application comprises utilizing, by the one or more processors, an application programming interface (API) exposed by the network access provider to install the service definition in the service policy database such that the network access provider steers traffic to the SaaS application via preferred paths or interfaces.

13. The system of claim 8, wherein the policy indicates a threshold volume of traffic to a given SaaS application to enable the network optimizations, and wherein determining whether to enable the network optimizations for the traffic comprises determining whether a volume of the traffic through the network access provider to the SaaS application is greater than the threshold volume.

14. The system of claim 8, wherein the service handler is associated with multiple different network access providers, the operations further comprising:
   determining, based at least in part on another policy associated with another network access provider, whether to enable network optimizations for other traffic through the other network access provider to the SaaS application; and
   based at least in part on a determination that the network optimizations are to be enabled for the other traffic to the SaaS application, installing the service definition associated with the SaaS application in another service policy database of the other network access provider.

15. One or more non-transitory computer-readable media storing instructions that, when executed, cause one or more processors to perform operations comprising:
   determining a software as a service (SaaS) application that is being accessed by client endpoints via a network access provider;
   determining, based at least in part on a policy associated with the network access provider, whether to enable network optimizations for traffic through the network access provider to the SaaS application; and
   based at least in part on a determination that the network optimizations are to be enabled for the traffic to the SaaS application, installing a service definition associated with the SaaS application in a service policy database of the network access provider.

16. The one or more non-transitory computer-readable media of claim 15, wherein determining the SaaS application that is being accessed comprises:
   receiving, from the network access provider, flow data associated with the traffic through the network access provider; and
   accessing a global SaaS repository to identify, based at least in part on the flow data, the SaaS application being accessed.

17. The one or more non-transitory computer-readable media of claim 16, wherein the global SaaS repository is configured to store SaaS applications of multiple SaaS providers, the SaaS applications defined in the global SaaS repository by at least one of a domain name, an internet protocol (IP) address, a port, or a protocol.

18. The one or more non-transitory computer-readable media of claim 16, wherein the flow data includes information associated with the client endpoints and access points of the client endpoints, the information including at least one of flows associated with the client endpoints or the access points, DNS queries of the client endpoints, or SaaS application usage of the client endpoints.

19. The one or more non-transitory computer-readable media of claim 15, wherein installing the service definition associated with the SaaS application comprises utilizing, by the one or more processors, an application programming interface (API) exposed by the network access provider to install the service definition in the service policy database such that the network access provider steers traffic to the SaaS application via preferred paths or interfaces.

20. The one or more non-transitory computer-readable media of claim 15, the operations further comprising:
  determining, based at least in part on another policy associated with another network access provider, whether to enable network optimizations for other traffic through the other network access provider to the SaaS application; and
  based at least in part on a determination that the network optimizations are to be enabled for the other traffic to the SaaS application, installing the service definition associated with the SaaS application in another service policy database of the other network access provider.

\* \* \* \* \*